C. RYDEN.
SPEED CONTROLLING DEVICE.
APPLICATION FILED FEB. 25, 1913.

1,089,793.

Patented Mar. 10, 1914.

4 SHEETS—SHEET 1.

WITNESSES
H. M. Spangler
S. C. McBride

INVENTOR
Claes Ryden
BY
Foster Freeman Watson & Coit
ATTORNEYS

C. RYDEN.
SPEED CONTROLLING DEVICE.
APPLICATION FILED FEB. 25, 1913.

1,089,793.

Patented Mar. 10, 1914.

4 SHEETS—SHEET 4.

WITNESSES
H. M. Spangler
S. C. McBride

INVENTOR
Claes Ryden
BY
Foster Freeman Watson & Coit
ATTORNEYS

UNITED STATES PATENT OFFICE.

CLAES RYDEN, OF PROVIDENCE, RHODE ISLAND, ASSIGNOR TO UNIVERSAL WINDING COMPANY, OF PORTLAND, MAINE, A CORPORATION OF MAINE.

SPEED-CONTROLLING DEVICE.

1,089,793.  Specification of Letters Patent.  Patented Mar. 10, 1914.

Application filed February 25, 1913. Serial No. 750,636.

*To all whom it may concern:*

Be it known that I, CLAES RYDEN, a citizen of the United States, residing at Providence, in the county of Providence and State of Rhode Island, have invented certain new and useful Improvements in Speed-Controlling Devices, of which the following is a specification.

My invention relates to speed-controlling devices and is particularly adapted for use on winding machines to regulate the speed ratio between two rotating elements, such as the winding-spindle and traverse-cam.

The object of the invention is to provide a simple and positive means for adjusting the speed of the thread-guide in relation to that of the winding-spindle (or vice versa) to regulate the laying of the coils or windings on the spindle so that they may be properly positioned in relation to each other.

The following specification fully describes the invention and is illustrated by the accompanying drawings in which like letters of reference represent like parts.

Figure 1:
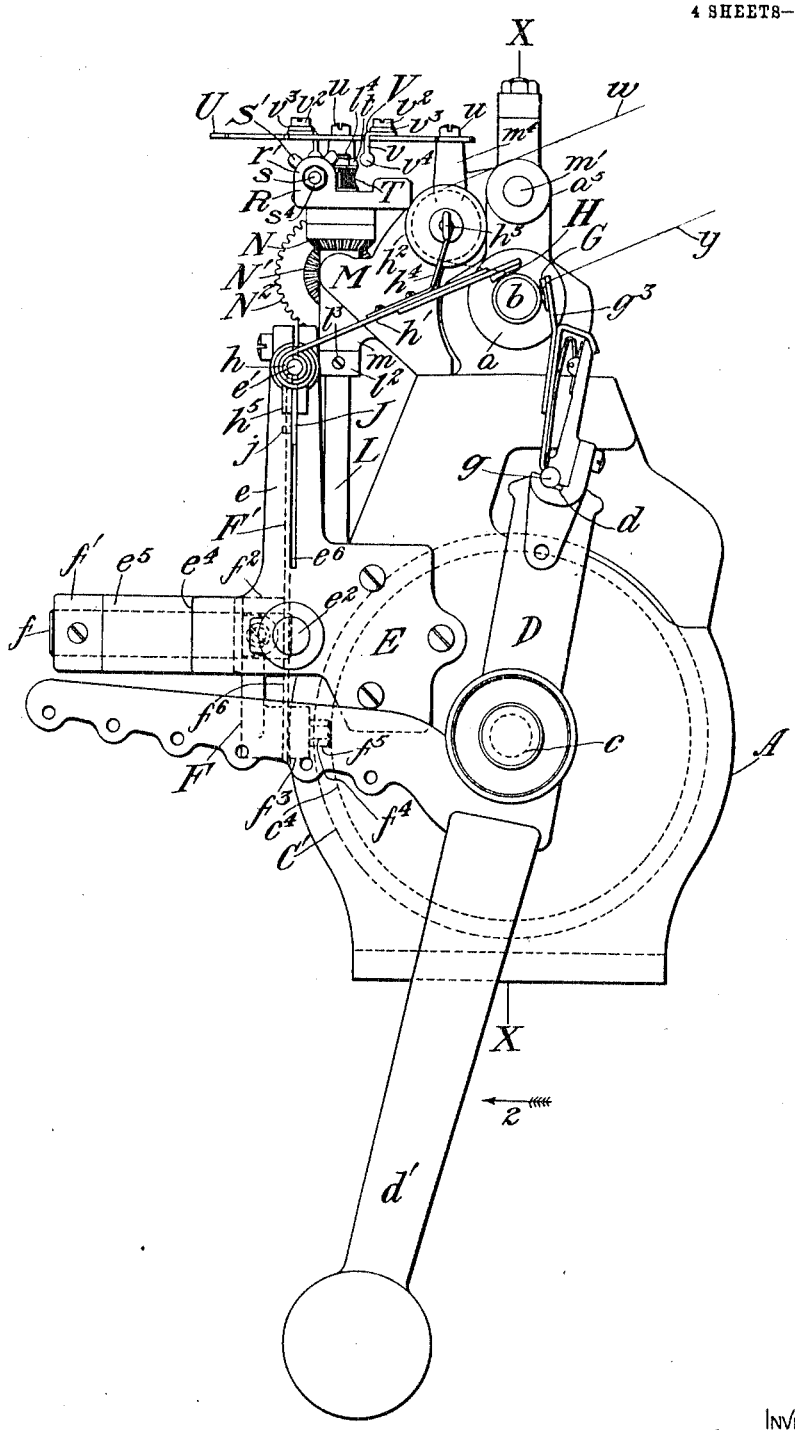
Figure 2:
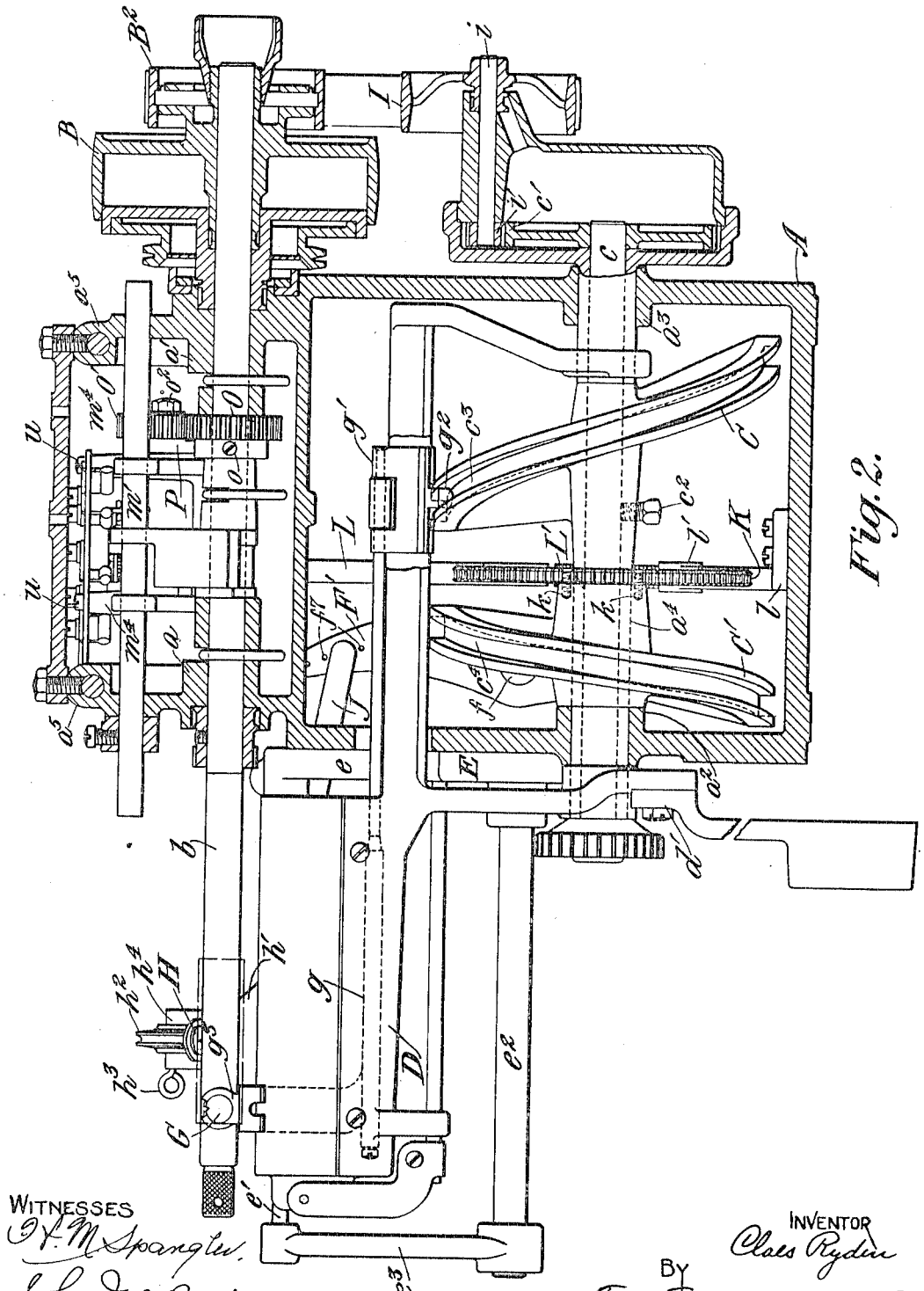
Figures 3, 4:
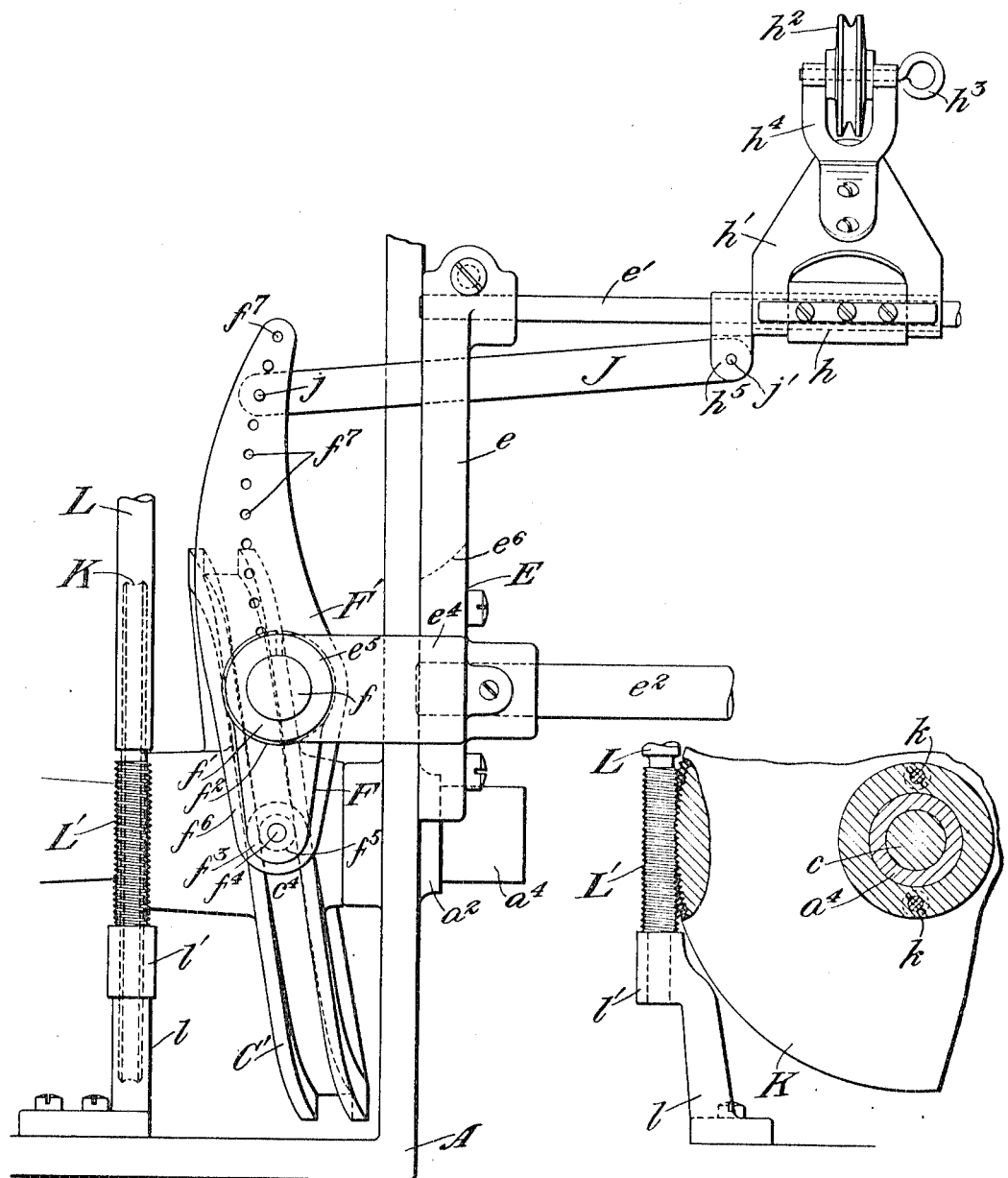

Figure 1 is an end elevation of a winding machine showing my new device applied thereto; Fig. 2 is a side view of the machine, shown partly in section on the line X—X of Fig. 1, looking in the direction indicated by the arrow 2; Fig. 3 is a detail view of a portion of the traverse-mechanism of the machine; Fig. 4 is a detail view of the worm and worm-wheel for rotating the traverse-cam; Figs. 5, 6, 7 and 8 are enlarged detail views of the speed-controlling device, showing it detached from the winding machine.

My new device is here shown and described as applied to a winding machine of substantially the same design as that disclosed in an application for Patent Serial No. 748,221, filed Feb. 13, 1913, by Max Helm of Germany. In this previous invention the machine is adapted for winding coils for electrical purposes and embodies the use of a plurality of guides arranged to be reciprocated in respect to the winding-spindle and operated simultaneously, but independently of each other. One guide acts to lay the windings of wire or other conductive material, while one or more other guides deposit windings of insulating material, such as yarn or thread, among the wire windings. The wire is laid in a close wind in the usual manner of spool winding and the insulating material is laid in open helices with a diagonal or "cross-wind". The windings of yarn intermingle with the wire windings, crossing over and under the latter at regular intervals, and serve to bind the wire windings in place and assist in insulating them, one from another, while providing insulation between the layers. In this type of machine the guide for the insulating material is operated with a quick traverse, while the guide for the wire is given a relatively slow traverse. Both guides are operated simultaneously and are usually reciprocated through the means of separate traverse-cams driven from the main shaft or winding-spindle of the machine. Means are provided for regulating the speed of traverse of the guides in relation to the speed of rotation of the spindle in order to effect the proper disposition of the windings in the coil, and the present invention is shown as applied to the machine to control the speed of the wire-guide. It is to be understood, however, that the same or a modified arrangement of mechanism might be applied to other forms of winding machines or used in connection with other apparatus for securing similar effects.

Referring to the drawings the complete apparatus is arranged as follows: The main frame A of the machine is constructed with bearings $a$, $a'$ for the winding-spindle $b$ which latter is adapted to be rotated from any suitable source of power through the medium of the usual driving-pulley B. Mounted in bearings $a^2$, $a^3$ in the frame A is a cam-shaft $c$ arranged below and parallel with the spindle $b$ and adapted to be driven therefrom. The cam-shaft $c$ carries the cams C and C' which are connected to reciprocate the thread-guide G and wire-guide H as hereinafter more particularly described. The means for connecting the spindle $b$ to rotate the cam-shaft $c$ as here shown is the same as that described in the previous application above referred to and consists essentially of an expansible pulley B² belted to a pulley I which is mounted fast on a shaft $i$. At the opposite end of the shaft $i$ is a pinion $i'$ which meshes with a gear $c'$ secured to the end of the cam-shaft $c$.

The cam C which drives the thread-guide G is mounted directly on the shaft $c$ and secured rotatably therewith by the set-screw $c^2$; while the cam C' for the wire-guide H is mounted on a bushing $a^4$ and adapted to be rotated independently of the cam-shaft $c$. The cams C and C′ are connected to drive their respective guides G and H as now described: The thread-guide G is supported in a swinging traverse-frame D pivoted on the axis of the cam-shaft $c$, see Fig. 1, and arranged to move away from the winding-spindle $b$ which overhangs the front end of the frame A. The guide G is adapted to bear against the periphery of the spindle $b$ and is carried by a guide-holder $g^3$ which is secured to the end of the traverse-rod $g$. The rod $g$ slides in a groove $d$ in the frame D and carries at its inner end a slide or runner $g'$ from the lower side of which projects a roll or stud $g^2$ engaging the groove $c^3$ in the cam C. The guide G is kept constantly in contact with the winding by the pressure of the frame D which is counterweighted at $d'$ and as the winding increases in diameter the guide recedes from the axis of the winding-spindle $b$ and causes the frame D to swing back therewith.

The guide H for the conducting material, called for convenience the wire-guide, might be arranged to be supported in the same manner as the guide G, but I have preferred to here illustrate a slightly different construction of the machine in this respect. Secured to the front of the frame A is a bracket E having an upwardly projecting arm $e$ which supports a longitudinally extending rod $e'$ arranged parallel with the winding-spindle $b$. Below the rod $e'$ and parallel therewith is a larger rod $e^2$ which also projects from the bracket E and carries a vertical arm $e^3$ at its outer end, see Fig. 2. The arm $e^3$ has a bearing at its upper end which serves as a support for the end of the rod $e'$ to hold the latter rigid and prevent it from bending or vibrating. Mounted to slide on the rod $e'$ is a sleeve $h$ on which is pivoted a bifurcated arm $h'$ adapted to carry the wire-guide H. The arm $h'$ also carries a guide-wheel or pulley $h^2$ pivoted on a pin $h^3$ which extends through bearings in the fork $h^4$ secured to the arm. Extending rearwardly from the bracket E is an arm $e^4$ terminating in a relatively long hub or bearing $e^5$, see Fig. 1. Mounted to rock in the bearing $e^5$ is a shaft $f$ to the outer end of which is secured a collar $f'$. Fastened to the inner end of the shaft $f$ is an arm or lever F the hub $f^2$ of which abuts the end of the bearing $e^5$ and together with the collar $f'$ holds the shaft from longitudinal movement. The lower end of the arm F is formed with a hub $f^3$ into which is driven a pin $f^4$, see Figs. 1 and 3. The pin $f^4$ serves as a bearing for a roll $f^5$ which engages the groove $c^4$ of the cam C′. A flat, sheet-metal arm F′ is secured to the end of the hub $f^2$ and is formed with a depending tail-piece $f^6$ having its end fitted over the hub $f^3$. The upper portion of the arm F′ is sickle-shaped and has a series of holes $f^7$ extending in an arc throughout its length. A flat connecting-rod or link J extends through a slot $e^6$ in the arm $e$ of the bracket E and carries a pin $j$ at one end adapted to engage with any one of the holes $f^7$ in the arm F′. The opposite end of the link J is connected by a pin $j'$ to an ear or lug $h^5$ on the sleeve $h$. The cam C′ imparts an oscillatory motion to the arms F, F′, which is transmitted through the link J to reciprocate the sleeve $h$ on the rod $e'$ and the wire-guide H is thereby caused to traverse longitudinally of the winding-spindle $b$. Referring to Fig. 1, the wire $w$ leads from its source of supply, not here shown, over the pulley $h^2$ and thence through a notch in the guide H to the spindle $b$. The tension on the wire tends to maintain the guide H in contact with the surface of the winding and as the latter increases in diameter the arm $h'$ swings on its bearings to allow the guide to recede from the axis of the winding-spindle.

The means for driving the cam C′ from the spindle $b$ and for controlling its speed of rotation in relation thereto, which forms the essence of the present invention, will next be described. As before stated, the cam C′ is mounted free to rotate on the bushing $a^4$ independently of the shaft $c$ and secured to the inner end of its hub by the screws $k, k$, see Fig. 4, is a worm-wheel or disk K. Fastened to the base of the frame A is a bracket $l$ formed with a step-bearing $l'$ for the lower end of a vertical rod or shaft L. The shaft L is cut with screw-threads or formed with a worm L′ adapted to engage the teeth of the worm-wheel K. The upper end of the shaft L is journaled in a bearing $m$ which forms part of a bracket M, see Figs. 1, 2 and 6, the latter being mounted on a rod $m'$ extending through lugs $a^5$, $a^5$ projecting from the top of the frame A. A collar $l^2$ secured to the shaft L by the set-screw $l^3$ below the bearing $m$ abuts the end of the latter and together with the step-bearing $l'$ takes the end thrust of the worm L′.

Figure 5:
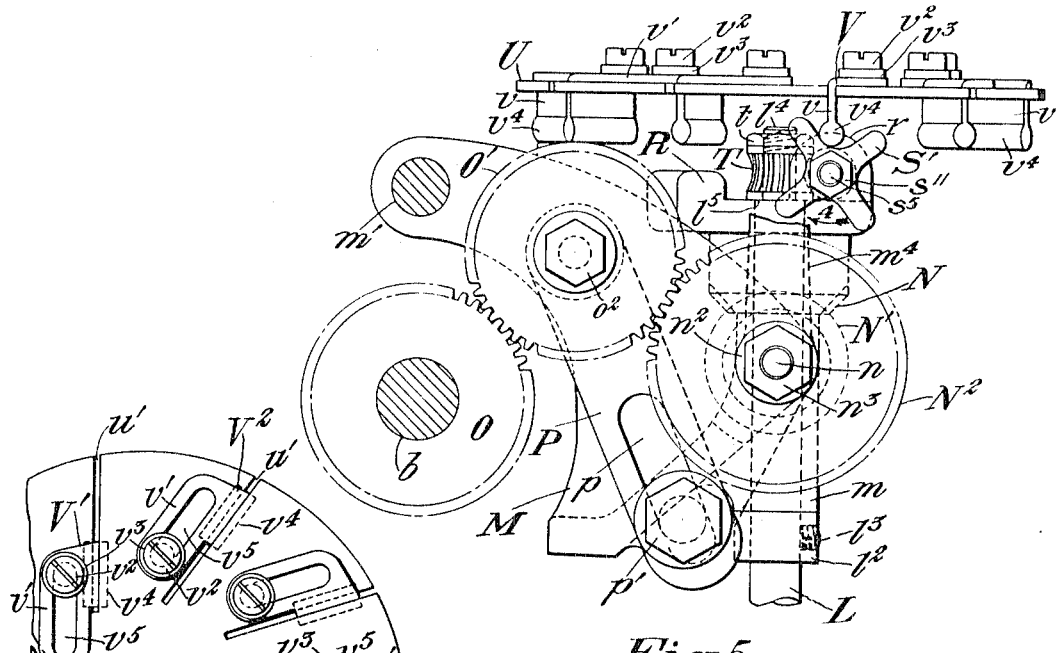
Figure 7:
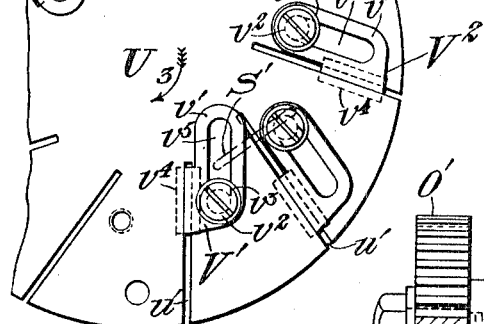
Figure 6:
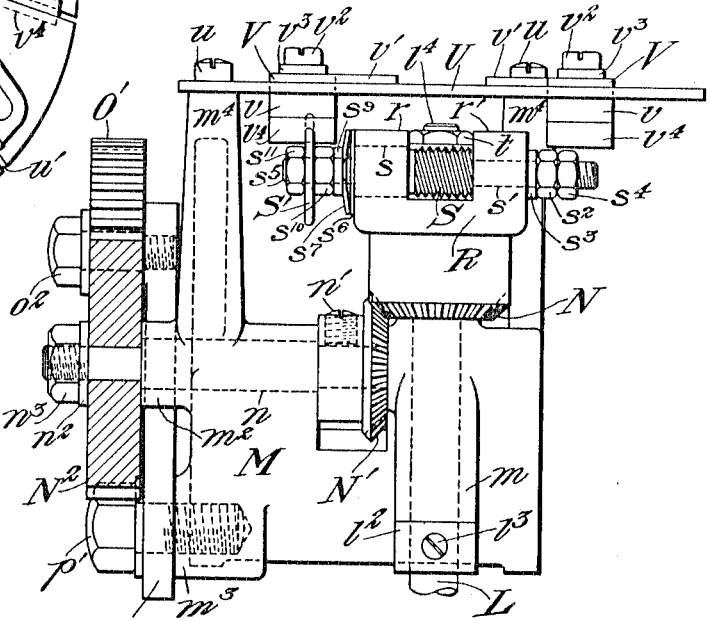

Mounted free to rotate on the shaft L above the bearing $m$ is a bevel gear N which meshes with a similar gear N′, see Figs. 5 and 6. The gear N′ is secured by means of a set-screw $n'$ to the end of a horizontal shaft $n$ which is journaled in a bearing $m^2$ formed on the bracket M. Secured to the opposite end of the shaft $n$ is a spur-gear N² held in place by the washer $n^2$ and nut $n^3$. A spur-gear O is mounted on the winding-spindle $b$ between the bearings $a, a'$ of the frame A, see Fig. 2, and secured rotatively with the spindle by means of the set-screw $o$. The gear O meshes with a similar gear O′ which, in turn, meshes with the gear N². Preferably, the intermediate gear O′ is mounted on a stud $o^2$ which is screwed into the end of an adjustable arm P. The arm P is formed with a slot $p$ through which extends a stud $p'$ screwed into a lug $m^3$ formed on the bracket M. Through this arrangement the arm P can be adjusted in relation to the axes of the spindle $b$ and shaft $n$ so that gears of different diameters may be substituted for the gears $O'$ and $N^2$. These change gears are provided to allow for adjustment in the speed ratio between the spindle $b$ and shaft $n$.

Figure 8:

Referring again to Figs. 5 and 6, the bevel gear N is secured to or forms part of a plate-member R which carries bearings $r, r'$ for a horizontal shaft $s$. The shaft $s$ is cut with screw-threads or formed as a worm S at a point midway of its extremities and the end portion $s'$ is turned down to fit the reduced bore of the bearing $r'$. The end of the portion $s'$ is threaded to receive a nut $s^2$ which abuts a washer $s^3$. The washer $s^3$ abuts the end of the bearing $r'$ and coöperates with the end of the worm S to hold the shaft $s$ from longitudinal displacement and the nut $s^2$ is prevented from turning by a check-nut $s^4$. The larger end of the shaft $s$ fits a bore in the bearing $r$ and is turned down at $s^5$ where it projects therefrom. Abutting the outer end of the bearing $r$ is a washer $s^6$ against which bears a saucer-shaped spring $s^7$. To increase its resilience the spring $s^7$ is preferably formed with prongs or fingers $s^8$, as illustrated in Fig. 8. Bearing against the convex face of the spring $s^7$ is a washer $s^9$ against which is screwed a nut $s^{10}$. The object of this arrangement is to cause friction on the bearing $r$ to provide a slight resistance to the rotation of the shaft $s$. A star-wheel S′, preferably formed with four points as shown in Fig. 5, is mounted on the end of the shaft $s$ and secured rotatively therewith by the nut $s^{11}$ which binds it against the nut $s^{10}$. The upper end of the shaft L is reduced in diameter at $l^4$ and mounted thereon is a worm-wheel or gear T secured rotatively by the nut $t$ which binds it against the shoulder $l^5$. The worm-wheel or gear T is in mesh with the worm S and therefore serves as a key to normally hold the plate-member R and bevel gear N from turning on the shaft L.

Extending upwardly from the bracket M are two posts $m^4$ on the top of which is mounted a circular plate U arranged with its center coincident with the axis of the shaft L and secured in place by the screws $u$. The plate U is formed with narrow slots $u'$, see Fig. 7, which extend inwardly from its edge at an angle to radii intersecting their ends. The drawings illustrate the plate as having ten slots, but a greater or less number could be used, and these slots are so positioned as to aline with the axis of the shaft $s$ when the latter is revolved about the shaft L to positions corresponding with the slots. That is to say, as the axis of the shaft $s$ assumes a position beneath any one of the slots $u'$, a vertical plane passing through the axis will pass through the center of the slot, thus bringing the star-wheel S′ at right-angles to the latter as shown by dash lines in Fig. 7. Adapted to slide in the slots $u'$ are contact-members V consisting of vertically arranged fingers $v$ having right-angled slotted plates $v'$ resting on top of the plate U. Suitable screws $v^2$ carrying washers $v^3$ extend through the slots $v^5$ in the members V to secure them in position after they have been adjusted in the slots $u'$. The fingers V are formed with cylindrical ribs $v^4$ extending along their lower edges and these are adapted to engage the points of the star-wheel S′ to rotate the latter as the shaft $s$ is revolved about the axis of the shaft L. When the contact-members V are set at the inner ends of the slots $u'$ in the plate U, as illustrated at V′, Fig. 7, they will make contact with the star-wheel S′ as the latter revolves around the plate; but when they are moved to a point adjacent the edge of the plate U, as shown at V², Fig. 7, the wheel S′ will pass by the fingers $v$ without being rotated thereby. It will thus be seen that by regulating the number of contact-members to be engaged by the star-wheel S′ during one revolution of the latter about the axis of the shaft L, the rotation of the wheel can be controlled within certain limits as more particularly pointed out hereinafter.

The operation of the complete machine is as follows: The spindle $b$ is rotated continuously and through the connections described drives the cam-shaft $c$ and cam C. The thread-guide G connected with the cam C is reciprocated therefrom and traverses the yarn $y$ along the spindle $b$ to wind it thereon in open helices. Meanwhile, the spindle $b$ also drives the vertical shaft L, through the train of gearing O, O′, N², N′ and N, and the worm L′ thereby turns the worm-wheel K which drives the cam C′. It will thus be seen that the cam C′ is rotated at a relatively slow rate of speed and through its connection with the wire-guide H a correspondingly slow traverse is given to the latter to lay the wire windings in close juxtaposition.

In order to adapt the machine to wind wire of different thicknesses or diameters and still provide for the close laying of the windings it is necessary to regulate the speed of traverse of the guide very accurately in relation to the speed of the winding-spindle. This is accomplished through the means above described which are operated as now explained: Normally, the shaft L is driven at the same rate of speed as the gear N, since they are practically keyed together through the worm S and worm-wheel or gear T, as before explained. When, however, it is desired to give a faster rate of speed to the shaft L than is imparted from the spindle $b$ through the gears O, O', $N^2$, N' and N the shaft $s$ is rotated to turn the worm-gear T ahead of the gear N. This is effected by rotating the star-wheel S' through its engagement with the contact-fingers $v$. The wheel S' revolves about the axis of the plate U in the direction indicated by the arrow 3, Fig. 7, and when one of its points comes into contact with one of the fingers $v$ it will be turned in the direction indicated by the arrow 4, Fig. 5, through one-quarter of a complete rotation. If only a slight increase over the normal rate of speed of the shaft L and cam C' is required only one of the contact-members V need be set to engage the star-wheel and therefore the worm S will advance the worm-wheel or gear T but a small fraction of a turn at each rotation of the gear N. By placing the star-wheel S' on the opposite end of the shaft $s$, between the nuts $s^2$ and $s^4$, the direction of rotation of the worm S can be reversed so that the speed of rotation of the shaft L will be retarded instead of accelerated in respect to the speed of the gear N. In this way further variations in the ultimate speed of the shaft L are provided for.

By increasing the number of contact-members set to engage the star-wheel a greater acceleration or retardation of the speed of the shaft L can be effected up to the point where all ten of the fingers $v$ act on the wheel S', in which case the latter will be turned ten times one-quarter or two and one-half rotations during one revolution of the gear N. In this way a large number of variations in the speed ratio between the guide H and spindle $b$ can be effected and further and more radical changes can be made by altering the ratios of the change gears O' and $N^2$. Through this arrangement I am enabled to attain a very accurate control of the speed of traverse of the wire-guide and to adjust the same to the minutest degree so that coarse or fine wire may be wound with great accuracy as to the disposition of the windings and proper variations made to accommodate very slight differences in the thickness of the wire.

Various modifications might be made in the form and arrangement of the parts of my device without departing from the spirit or scope of the invention; therefore, without limiting myself to the exact construction shown and described, what I claim is:—

1. In a winding machine, the combination with a rotating winding-spindle and reciprocating traverse-guide, of means to regulate the speed ratio between said spindle and guide comprising a shaft, means to drive said shaft from the spindle including a gear normally held rotatively with said shaft, a worm-wheel on said shaft, a worm engaging said worm-wheel, and means to rotate the worm to turn the shaft independently of the gear.

2. In a winding machine, the combination with the rotating winding-spindle and reciprocating traverse-guide, of means for controlling the speed ratio between said spindle and guide comprising a shaft, a gear mounted on said shaft, means to connect the gear rotatively with the winding-spindle, a worm mounted to revolve with the gear about its axis, a worm-wheel on the shaft engaged by said worm, and means to rotate the worm to vary the speed of rotation of the shaft as imparted by the gear.

3. In a winding machine, the combination with the rotating winding-spindle and reciprocating traverse-guide, of means for controlling the speed ratio between the spindle and guide comprising a shaft, a worm-wheel fast on said shaft, a worm engaging said worm-wheel, a gear on the shaft normally keyed rotatively therewith by the engagement of the worm and worm-wheel, means connecting said gear rotatively with the winding-spindle, and means to turn the worm during the rotation of the gear to vary the speed of rotation of the shaft.

4. In a winding machine, the combination with the rotating winding-spindle and reciprocating traverse-guide, of means for controlling the speed ratio between said spindle and guide comprising a shaft, a worm-wheel fast on said shaft, a gear mounted free on the shaft, a worm engaging the worm-wheel to key said gear with the shaft, means to drive said gear, and means actuated through the revolution of said worm with the gear to turn the worm and vary the speed of rotation imparted to the shaft through the gear.

5. In a winding machine, the combination with the rotating winding-spindle and reciprocating traverse-guide, of means for controlling the speed ratio of the same comprising a shaft, a worm-wheel fast on the shaft, a gear mounted free to turn on the shaft, a worm connected with said gear and engaging the worm-wheel to key the gear with the shaft, and means adjustable to cause a greater or less rotative movement of the worm to vary the speed of rotation imparted to the shaft through the gear.

6. In a winding machine, the combination with the rotating winding-spindle and reciprocating traverse-guide, of means for controlling the speed ratio of the same comprising a shaft, a worm-wheel fast on said shaft, a gear mounted free to turn on the shaft, a worm mounted on the gear and engaging the worm-wheel to connect the gear to drive the shaft, a star-wheel for turning the worm, and means adjustable into position to engage the star-wheel to turn the worm as the latter is revolved about the axis of the shaft.

7. In a winding machine, the combination with the rotating winding-spindle and reciprocating traverse-guide, of means for controlling the speed ratio of the same comprising a shaft, a worm-wheel fast on said shaft, a gear mounted free to turn on said shaft, a worm mounted on the gear to adapt it to engage the worm-wheel, a star-wheel connected with the worm, and a plurality of contact-members adjustable into position to engage the star-wheel to rotate the worm as the latter is revolved by the gear about the axis of the shaft.

8. In a winding machine, the combination with the winding-spindle and traverse-cam, of a speed-controlling device between the two comprising a worm-disk connected to the cam, a shaft, a worm on said shaft engaging the worm-disk, a worm-wheel fast on said shaft, a gear mounted free on the shaft, a worm carried by said gear and engaging the worm-wheel to connect the gear to drive the shaft, means to drive said gear from the winding-spindle, and means to turn the worm carried by the gear to vary the speed of rotation of the cam as imparted through the gear.

9. In a winding machine, the combination with the winding-spindle and traverse-cam, of a shaft connected to rotate the cam, a worm-wheel fast on said shaft, a gear mounted free on said shaft, a worm carried by said gear and engaging the worm-wheel to connect the gear to drive the shaft, means to rotate said worm during its revolution with the gear, and a train of gearing connecting said gear with the winding-spindle.

10. In a winding machine, the combination with the winding-spindle, of a cam-shaft arranged with its axis parallel therewith, a cam mounted free to rotate on the cam-shaft, a worm-disk secured to said cam, a vertical shaft, a worm on said shaft engaging the worm-disk, a worm-wheel fast on said shaft, a gear mounted free on the shaft, a worm carried by said gear and engaging the worm-wheel to connect the gear to drive the shaft, a train of chain gearing connecting said gear with the winding-spindle, and means to rotate the worm carried by the gear to vary the speed ratio between the spindle and cam.

11. In a winding machine, the combination with the winding-spindle, of a traverse-cam mounted to rotate on an axis parallel therewith, a worm-disk connected with said cam, a vertical shaft, a worm on said shaft engaging the worm-disk, means to drive said shaft from the winding-spindle, and means to impart an increment of motion to said shaft to vary the speed ratio between the spindle and cam.

In testimony whereof I affix my signature in presence of two witnesses.

CLAES RYDEN.

Witnesses:
 ARTHUR A. ARMINGTON,
 HERBERT K. ALLARD.

Copies of this patent may be obtained for five cents each, by addressing the "Commissioner of Patents, Washington, D. C."